Figure 1:
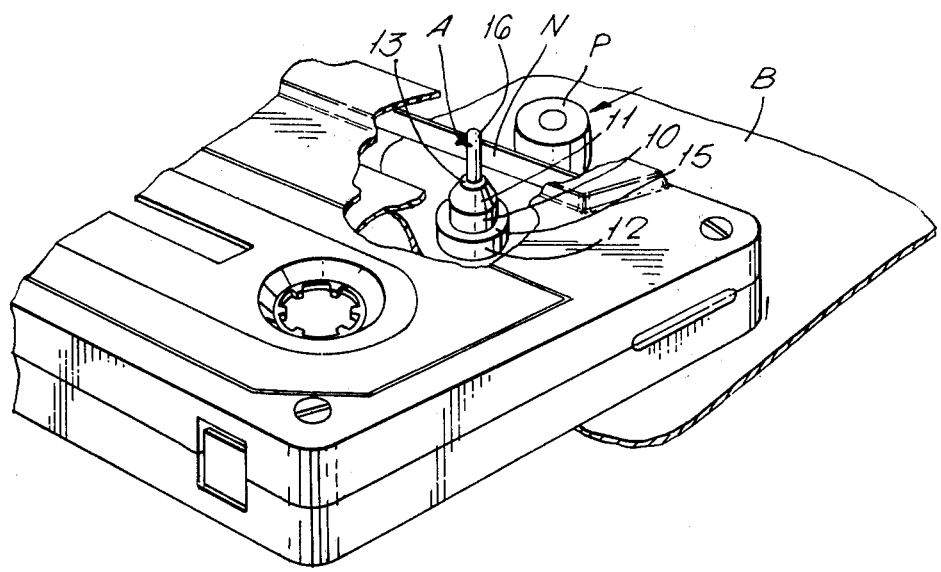

United States Patent [19]

Francolini

[11] 4,025,027
[45] May 24, 1977

[54] TAPE PROPELLING MEANS IN CASSETTE-TYPE TAPE-RECORDERS

[75] Inventor: Ermanno Francolini, Rome, Italy
[73] Assignee: SPEM Societa Prodotti Elettronici Meccanici S.r.l., Rome, Italy
[22] Filed: Jan. 23, 1976
[21] Appl. No.: 651,977
[30] Foreign Application Priority Data
  Jan. 29, 1975  Italy ............................... 47899/75
[52] U.S. Cl. .............................. 226/181; 226/194
[51] Int. Cl.² ........................................ B65H 17/22
[58] Field of Search .......... 226/181, 186, 187, 190, 226/194

[56] References Cited
UNITED STATES PATENTS

| | | | |
|---|---|---|---|
| 2,828,961 | 4/1958 | Rehklan | 226/186 X |
| 3,289,907 | 12/1966 | Horberg | 226/194 X |
| 3,754,696 | 8/1973 | Carolus | 226/194 X |

Primary Examiner—Richard A. Schacher

[57] ABSTRACT

In a cassette type tape recorder, a bush rigidly mounted on a wall of a housing of the recorder around an opening in said wall from which a capstan for propelling the tape cantilevers, the capstan being received in a bore of said bush and protruding from the top of said bush by a length identical with the width of the tape, said bush having a base and a cylindrical body forming a step with the base having an outer diameter slightly less than the diameter of a cassette opening, and an upper tapered portion, said bush body entering said cassette opening and centering the latter by said tapered portion and supporting same by the stepped base, whereby the capstan rotation is guided by the bush and the camber effect on the protruding length is so reduced as to minimize the wow and flutter values of the tape recorder.

1 Claim, 2 Drawing Figures

TAPE PROPELLING MEANS IN CASSETTE-TYPE TAPE-RECORDERS

This application relates to an improvement in the cassette-type tape-recorders, and more particularly to the tape propelling means thereof.

This invention is applicable to cassette-type tape recorders, and is a simple solution of some not-negligible problems arising from the construction of the members which propel the tape.

Indeed, in the tape recorders now available on the market the means which effect such propelling of the tape when operating in playback, comprise a capstan and a pressure roller, with the capstan that cantilevers from a wall of the housing receiving the cassette. The capstan is loosely received in a suitable opening or bore of the cassette, when the latter is brought into the operational position, in the tape recorder.

The length of the capstan which is cantilevering, i.e. the capstan portion that is not guided, is quite long since the free end portion thereof must be within the cassette housing at level with the tape pressure roller. Of course, this long cantilevering length of the capstan, because of the camber thereof, causes the capstan to rotate eccentrically with a resulting undue increase in the wow and flutter values of the tape recorder.

Moreover, with this kind of mechanism, there is the necessity of employing centering pin means to assure that the capstan fits exactly in the opening when the cassette is brought into the operational position, which centering means operates also for maintaining stationary the cassette during playback.

The use of this pin extending from the same wall of the capstan and parallel to the latter, results in the necessity of additional assembling operations, which increase the costs of manufacturing the recorder.

Accordingly, it is an object of this invention to provide guiding means for the capstan, comprising a special bush, which considerably reduces the cantilevering length of the capstan, and consequently the camber effects, resulting in a substantial reduction of the wow and flutter values of the tape recorder.

Is another object of the invention to provide such a guiding means which operates also to center the cassette in the housing, thus allowing the centering pin means, used heretofore, to be omitted.

According to the invention, a bush is rigidly mounted on the wall of the cassette housing around the opening from which the capstan is cantilevering, the capstan being received in the bore of this bush so that only a short end portion of the capstan, substantially identical in length with the tape width, is protruding from the bush top.

Accordingly, the capstan rotation is guided by the bush and the camber effect on the protruding length is so reduced as to minimize the wow and flutter values of the tape recorder.

The bush has an upper portion of frustum of cone or tapered configuration and a cylindrical body of such a diameter that the cassette opening receiving the capstan fits exactly on the outer cylindrical surface of the bush, thus being located behind the tape in respect of the pressure roller of the tape recorder.

Thus, according to the invention, the centering and retaining action heretofore exerted on the cassette by said centering pin is now exerted by the bush, so as to allow said centering pin to be eliminated.

Figure 2:
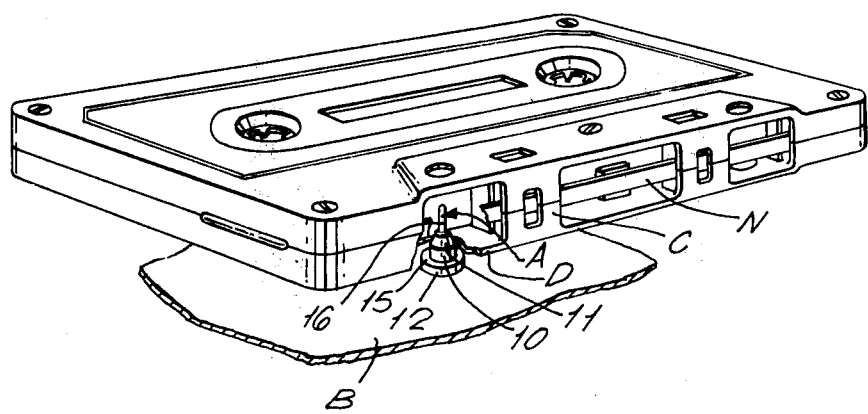

The guiding and centering bush of the invention will be now more particularly described with reference to the accompanying drawing, in which:

FIG. 1 is a fragmentary perspective view illustrating the guiding bush, the capstan length protruding from said bush, the cassette tape and the pressure roller of the tape recorder; and FIG. 2 is a fragmentary perspective view, from the opposite side and in reduced scale, showing the cassette fitted on the bush, the pressure roller being omitted.

The bush of the invention comprises a cylindrical body 10 and an upper portion 11 of tapered configuration.

The bush base 12 is rigidly connected to the wall B of the cassette housing and a length of the capstan A which propels the magnetic tape, is received in the bush bore with the upper end portion 16 of the capstan protruding from the bush top 13, this end portion 16 being slightly longer than the width of tape N.

As shown in FIG. 2, the opening 14 of cassette C fits exactly on the body 10 of the bush, thus centering the cassette and maintaining the cassette fixed in position. Capstan A is guided by the bush except the end portion 16 thereof, which is intended to propel the tape N, when the latter is pressed against the capstan by the pressure roller P of the tape recorder.

The reduced length of this end portion 16 of the capstan, cantilevering from the bush top, reduces the lever effect exerted by the capstan inside the bush resulting from the laterally directed pressure exerted by the pressure roller, thus reducing wearing both of the capstan and bush and helping in keeping low the wow and flutter values of the system.

It will be appreciated that the tapered configuration of the portion 11 of the bush centers the cassette opening 14, making easier a seating thereof on the body 10. Moreover a stepped circular portion 15 supports the cassette wall D in the area around the opening 14. It will be also appreciated the remarkable improvement provided by the bush of the invention as the bush increases the length of the guided portion of the capstan without unduly increasing the thickness of the tape recorder.

The bush of the invention is preferably made of a self-lubricating plastic material, in order to assure a smooth rotation of the capstan within the axial bore thereof.

I claim:

1. In a cassette type tape recorder comprising a housing for receiving the cassette, having at least one wall; a pressure roller for the tape; a capstan for propelling the tape, adapted to fit in an opening of said cassette behind said tape in respect of said pressure roller, and passing through and protruding from an opening in said wall; the improvement comprising guide bush means including: a base rigidly fixed to said wall, around said wall opening with an axial bore in alignment therewith; a cylindrical body, forming a step with said base, having an outer diameter slightly less than the diameter of said cassette opening, and having an upper portion of tapered configuration, said capstan being received in said axial bore of said bush means and protruding from the top of said bush means by a length identical with the width of said tape, said bush means body entering said cassette opening and centering the latter by means of said tapered upper portion thereof, keeping the cassette in position by means of said cylindrical body and supporting the cassette by means of the stepped base, said bush means further guiding a substantial length of the capstan, and thus reducing the chamber effect on the capstan length protruding from said wall opening in order to keep at a minimum the wow and flutter values in the tape recorder.

* * * * *